Aug. 13, 1963 M. MARKS 3,100,873

CIRCUIT FOR AUTOMATICALLY MAINTAINING THE AMPLITUDE VARYING PEAKS WITHIN OPERATING RANGE OF A SIGNAL OF A VACUUM TUBE

Filed June 1, 1959 2 Sheets-Sheet 1

INVENTOR.
MEYER MARKS
BY John L. Wiegreffe
ATTY.

CIRCUIT FOR AUTOMATICALLY MAINTAINING THE AMPLITUDE VARYING PEAKS WITHIN OPERATING RANGE OF A SIGNAL OF A VACUUM TUBE

Filed June 1, 1959 2 Sheets-Sheet 2

INVENTOR.
MEYER MARKS
BY John L. Wiegreffe
ATTY.

United States Patent Office 3,100,873

Patented Aug. 13, 1963

3,100,873

CIRCUIT FOR AUTOMATICALLY MAINTAINING THE AMPLITUDE VARYING PEAKS WITHIN OPERATING RANGE OF A SIGNAL OF A VACUUM TUBE

Meyer Marks, Clarendon Hills, Ill., assignor to Admiral Corporation, Chicago, Ill., a corporation of Delaware Filed June 1, 1959, Ser. No. 817,410

3 Claims. (Cl. 328—165)

This invention relates to improvements in signal translation systems and particularly to means for varying the transfer characteristics thereof in response to the amplitude of the received signal.

The invention is particularly applicable to radiant energy control systems in which the information is conveyed by the mere presence of the carrier as distinguished from those systems in which the information is conveyed by the modulation components. It is to be understood however, that the invention may be used with systems in which a carrier is modulated. In the embodiment chosen for the purpose of illustrating the invention a damped carrier of ultrasonic frequency is used. This carrier has a relatively large initial amplitude and a very high damping decrement.

In the specific embodiment chosen to illustrate the invention the translation system is used with a portable transmitter arranged to generate an inherently damped ultrasonic signal for initiating the receiving unit. Because of the relatively small amount of energy in the signal and the distance between the source and the receiving unit of the control system, it is necessary to employ an amplifier capable of very high gain. Since the transmitter is portable the system will be operated under conditions where the range of variation in the distance between the transmitter and the receiver units will be very great and consequently the range of variation of the signal energy input will be very great. Accordingly, it is necessary to have a signal translation means associated with the receiving unit which can accommodate itself to the wide range of signal intensities received by the receiving unit without the characteristics of the signal translation system or any of its components being adversely affected by either extreme of the range of amplitude.

It has been mentioned above that the information is carried by the carrier itself without modulation. However, due to the environment in which this system is usually operated there will be reflections of the radiant energy from objects and walls in the adjacent vicinity and these reflections interacting with each other as well as with the original signal will, in effect, produce a combination of amplitude and angular modulation thereby resulting in a signal which is modulated in a very complex manner. Because of the wide range of the amplitude of such a complex signal some of the components of the signal channel cannot follow the wide range of excursion of the input amplitude without overloading at the high energy end of the range if they are continuously subjected to the incoming signal.

The present signal translation system is particularly adapted for use with a source of ultrasonic control signal in which the signal emanates from a longitudinally vibrating bar excited by a heavy impact on one end. Due to a plurality of factors the output from this bar is highly damped. Therefore, the initial signal input to the receiver unit will be very large, relatively speaking, as compared to the amplitude at the end of a time interval long enough to actuate the receiver equipment. In this connection it should be said in passing that in a signal translation system of the type under consideration here it is conventional to use means such as a time-discriminator integrating network, for the purpose of preventing the utilization device from being operated by random noise signals lying in the control signal frequency spectrum and having a time duration less than a predetermined minimum. Since conventional components used in signal translation systems do not have a logarithmic response characteristic similar to that of the amplitude response curve of the human ear, these devices are not capable of following the wide range of amplitude without exceeding their normal operating limits. In other words, if the components are capable of accepting the low end of the range of amplitude they will be overloaded or saturated at the high end which in some instances can result in substantial waste of power and/or result in adverse effects on some of the components. As an example, in the embodiment of the invention described there is a frequency discriminator component in which the discriminating action is adversely affected by high signal strength in the channel. Therefore, it will be readily apparent that it is necessary to put some kind of limiting component in the signal channel at an appropriate point. In conventional limiting devices, limiting action is on the basis of amplitude alone. On the other hand the present invention relies upon controlled intermittent discontinuity of operation or modulation of the output of one of the components to effect limitation of the power output of the control component.

Accordingly, it is a primary object of the present invention to provide a novel means for automatically controlling the transfer characteristic of a signal translation channel in response to the input signal.

Another object is to provide means for controlling the transfer characteristic of a signal translation channel in such a manner as to limit the output power of a component in the channel in accordance with a voltage derived from the input signal, and which represents the combination of the instantaneous alternating current envelope of the carrier peaks plus the charge remaining on the input coupling capacitor.

Other and further objects will become apparent from the following description when considered in connection with the accompanying drawings, in which.

Figure 2:
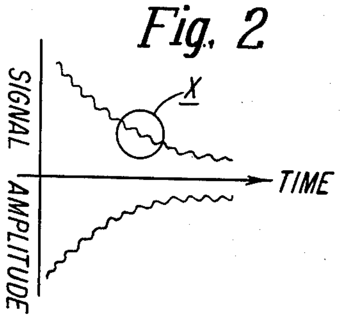
FIG. 2 is a curve showing the amplitude versus time characteristics of one type of signal which may be used to control a signal translation system embodying the invention.
Figure 2A:
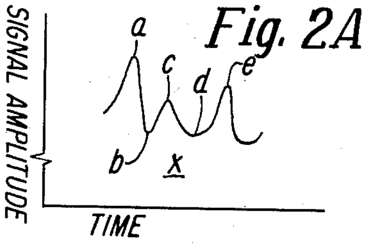

FIG. 2*a* is an expanded view of a portion of the curve of FIG. 2.

Figure 3:
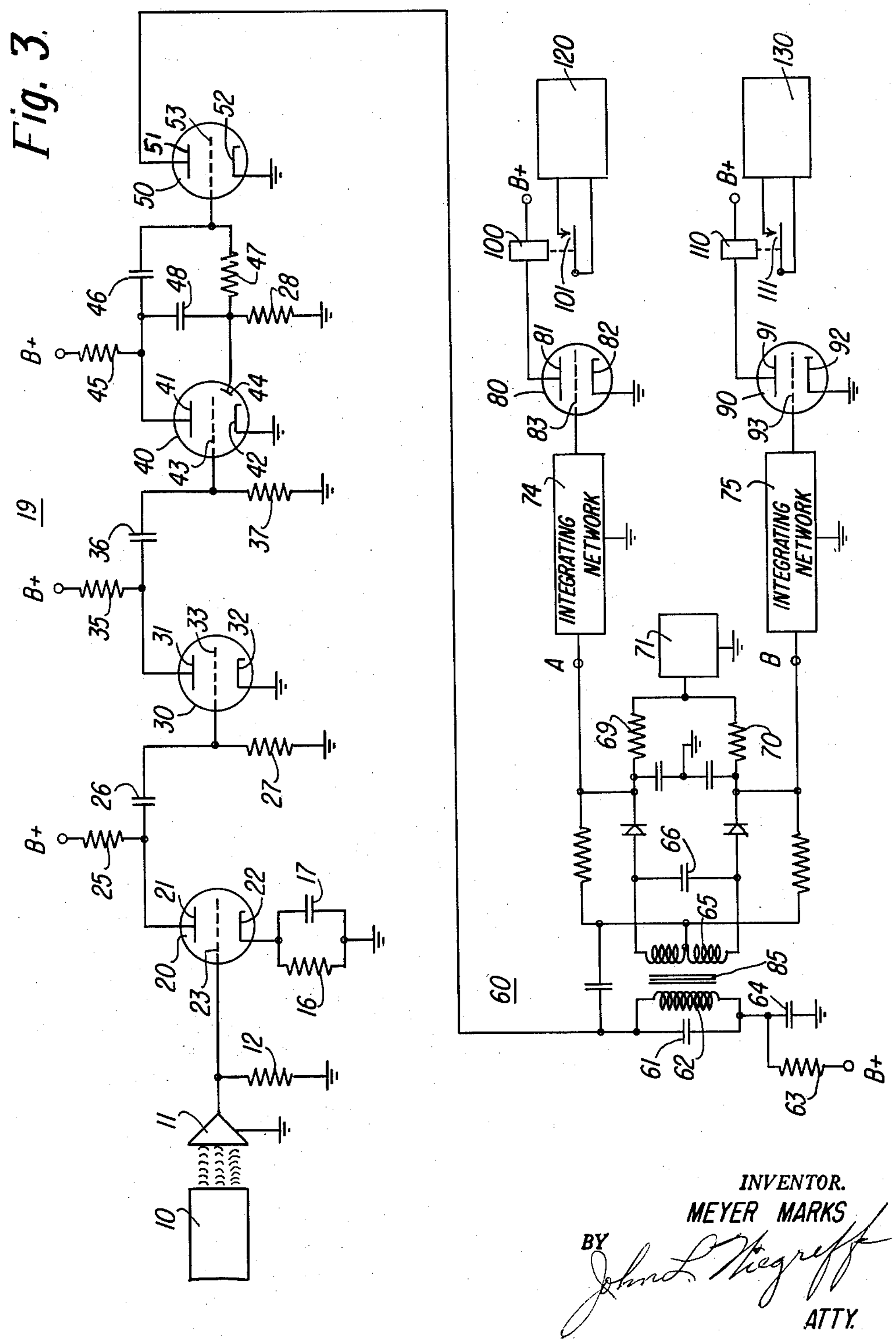

FIG. 3 is a schematic diagram of a signal translation system employing the invention.

Figure 4:
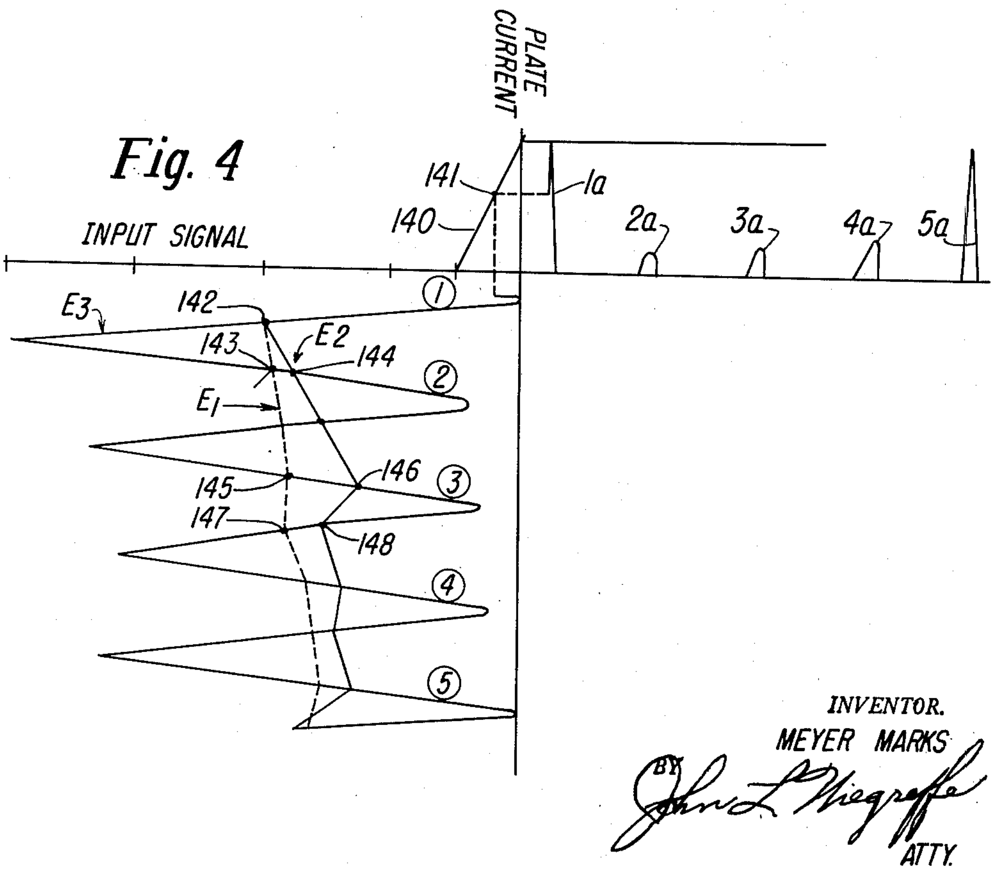

FIG. 4 is a curve showing the effect of the non-linear coupling circuit of the invention.

Figure 1:
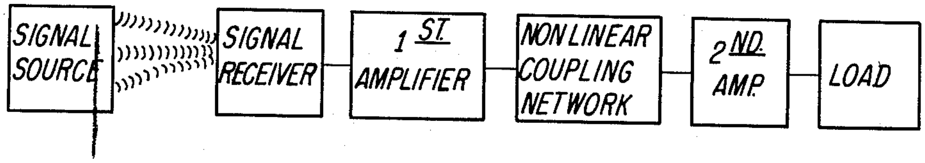
FIG. 1 represents in block form a signal translation system incorporating the invention.

In FIG. 1 there is shown a very simplified block diagram of a signal translation system employing the invention. The individual blocks are labeled in accordance with their functions. A signal source which is capable of transmitting individual radiant energy signals of the type above described is provided. The transmitted signals are picked up by a signal receiving device and coupled to a first amplifier. The amplified signal is then fed to a coupling network which is the subject of the present invention and which will be more fully described hereinafter. After passage through the coupling network, the signal is further amplified and fed to the load circuits to effect their operation. Briefly, the coupling network includes means for preventing overload with its previously mentioned concomitant adverse effects on the circuitry following the coupling network.

In FIG. 2 a rough approximation of the wave envelope of one type of control signal is shown. This envelope shape is particularly representative of an ultrasonic control signal which, as mentioned previously, is generated by setting a tuned rod into longitudinal vibration. The curve shows the signal amplitude as a function of time. It should be understood that this is merely the envelope shape of the ultrasonic signal, and, therefore, the individual cycles of the signal, the peaks of which determine the wave shape envelope, are not shown. The departure of the envelope from a smooth wave is due to the complex modulations resulting from reflections, noise, movement of the transmitter at the time the rod is set into vibratory motion, etc.

FIG. 2A is an enlarged view of the portion of the wave envelope of FIG. 2 which is indicated by the circle labeled X. As is seen in this enlarged view, the signal has a fair amount of complex modulation. The fact that it is known in advance that the signal will have peaks (*a*, *c*, *e*) and valleys (*b*, *d*), allows the non-linear coupling network of the invention to be designed such that a "sampling action" of the signal amplitude may be performed and the information resulting therefrom used to control the transfer characteristic of the following amplifier to automatically prevent overload of the critical circuitry in the translation system.

Referring now to FIG. 3, there is shown a schematic diagram of an ultrasonically controlled signal translation system embodying the invention. This system includes an ultrasonic transmitter 10, a microphone 11, and a signal translation channel comprising an amplifying means 19, a discriminator 60, a pair of integrating networks 74 and 75, a pair of relay tubes 80 and 90, control relays 100 and 110 and utilization devices 120 and 130. Amplifying means 19 comprises amplifier tubes 20 to 50 inclusive. Signals picked up by microphone 11 are impressed upon resistor 12, which is connected to grid 23 of tube 20. Cathode 22 is shown elevated from ground potential as a result of the voltage developed across cathode resistor 16 by the quiescent current flow between plate 21 and cathode 22. It will be appreciated, however, that this form of signal coupling and tube biasing is illustrative only and other well known methods may be employed with equal facility.

The amplified signal voltages in the output of tube 20 are coupled to grid 33, biased by resistor 27 of tube 30 through a coupling capacitor 26. Cathode 32 is grounded and plate 31 is connected through a resistor 35 to a source of positive potential B+. Signals in the output of tube 30 are similarly coupled to grid 43 of tube 40 through coupling capacitor 36, these signal voltages appearing across grid resistor 37.

Signal voltages impressed upon grid 43 cause corresponding changes in the current flowing from cathode 42 to plate 41, which is connected to B+ through a resistor 45. Tube 40 contains a diode plate 44 which has signal voltage impressed upon it by way of a capacitor 48. Plate 44 and cathode 42 function to rectify the signal. Due to this rectifying action of plate 44 and cathode 42, capacitor 48 has a very short time constant during the positive half of the signal cycle since the resistance between plate 44 and cathode 42 is quite small during conduction. During the negative half of the signal cycle of capacitor 48, the rectifying action does not occur and resistor 28 is the predominating resistance in the discharge path. Therefore, capacitor 48 has a very short time constant for the positive half of the signal and a relatively long time constant for the negative half of the signal. Capacitor 48 is charged to the positive peak amplitude of the first cycle of signal substantially instantaneously. The voltage at the junction of plate 44 and resistor 28, which is applied to grid 53 of tube 50 through resistor 47, establishes the bias on this tube and the succeeding cycle of signal will produce output in tube 50 as a function of its positive excursion and the stored charge in capacitor 48.

Capacitor 46 couples the signal to grid 53 of tube 50. Capacitor 46 is a storage capacitor whose rate of discharge is determined by the potential at the junction of capacitor 48 and resistor 28 and the value of resistor 47. The above junction potential is in turn dependent upon the charge stored in capacitor 48 which as we have seen previously is dependent upon the next preceding conductive cycle of signal.

The output of tube 50 is connected to a discriminator 60 which, as shown, is of the conventional phase-shift type. Discriminator 60 has a tuned primary and a tuned secondary, the tuned primary consisting of winding 62 and its parallelly connected capacitor 61, the tuned secondary comprising center tapped winding 65 and its parallelly connected capacitor 66. The tuned primary is connected to ground through a capacitor 64. An iron core 85 is shown between the primary and secondary, though in actual practice more than one iron core is used.

Outputs A and B of discriminator 60 are normally held at a negative potential due to the connection thereto of a bias voltage from negative bias supply 71 through resistors 69 and 70, respectively.

As mentioned previously, discriminator 60 is of the phase-shift type. Assuming that transmitter 10 has provision for transmitting either of two ultrasonic signals which differ in frequency, discriminator 60 will be tuned to a frequency lying midway between these two frequencies of transmitter 10. As is well known in phase shift discriminators, output A, for instance, will be energized responsive to receipt of the lower of these two frequencies, and output B will be energized responsive to receipt of the higher of these two frequencies.

Output A is connected to an integrating network 74, which acts to time the duration of the lower frequency signal from transmitter 10. After the signal has persisted for a predetermined time, grid 83 of relay tube 80 will be driven in the positive direction and allow sufficient current to flow between plate 81 and cathode 82 to energize relay 100. Relay 100, upon energization, actuates a set of contacts 101 which are shown connected to a block 120, which may be any utilization device. Similarly, output B is connected to integrating network 75, which times the duration of the higher frequency control signal of transmitter 10 and controls the operation of relay tube 90, in the plate circuit of which relay 110 is connected. Upon energization of relay 110, contacts 111 are closed, and the utilization device indicated by the block labeled 130 is actuated.

It has been found that, when using a conventional limiter in the place of amplifier tube 50, the cores of discriminator 60 tend to saturate which has the undesirable effect of shifting the frequency to which discriminator 60 is tuned. As will be seen hereinafter, with the coupling circuit of the invention the current flow through discriminator 60 is substantially reduced, and hence core saturation does not occur.

Reference is now made to FIG. 3 in conjunction with FIG. 4, in which a curve 140 showing the transfer characteristic of tube 50 and several cycles of input signal with the corresponding output current (1*a*–5*a*) in the plate circuit of tube 50 are shown. E3 represents the ultrasonic signal with the sporadic modulation which has previously been described. E2 represents the voltage from the junction of capacitor 48 and resistor 28 to ground as shown in FIG. 3. E1 is the voltage between grid 53 and cathode 52, which is grounded.

As shown on the characteristic curve 140, output of tube 50 is cut off at the intersection of the characteristic curve and the horizontal axis. With no aplied signal the operating point of tube 50 is at 141 on characteristic curve 140. Assume the first cycle of a signal with an excursion large enough to cause grid current flow is applied. Plate current indicated by 1*a* flows. The bias voltage E1 follows along the signal curve E3 until point 142 is reached. This point is the point at which the rectifier comprising plate 44 and cathode 42 of tube 40 ceases conduction. At point 142 the voltages E1 and E2 are thus assumed to be equal. Capacitor 48 begins discharging through resistor 28. As capacitor 48 discharges, a voltage differential is developed across resistor 47, which causes current flow through it. This is the discharge current of capacitor 46.

This action continues during the negative half of cycle 1 until points 143 and 144 are reached. Since the discharge of capacitor 46 is a function of the voltage across capacitor 48, capacitor 46 discharges at a slower rate than capacitor 48. This is evidenced by the difference in slope between the line joining points 142 and 143, representing the discharge of capacitor 46, and the line joining points 142 and 144, representing the discharge of capacitor 48. It will thus be seen that tube 50 is biased back to point 143 at the beginning of the next positive cycle. Thus, if the next cycle has approximately the same positive excursion, the peak voltage will lie within the operating range of tube 50. The positive excursion of cycle 2 as shown in the drawing is assumed to be smaller than the positive excursion of cycle 1, and, therefore, less current appears in the plate circuit of tube 50 as is indicated by 2*a*.

This process continues until the advent of cycle 3, which is assumed to have the same positive excursion as cycle 2. During the negative portion of cycle 2 the bias on tube 50 has decreased from point 143 to point 145. The voltage across capacitor 48 has decreased from point 144 to point 146. The positive excursion of cycle 3 is now sufficiently great to override this bias and a larger amount of plate current, indicated by 3*a*, flows in tube 50. Capacitor 48 now charges to the peak voltage of the positive excursion of cycle 3 as indicated by the reverse slope of the line joining point 146 and point 148. Meanwhile, capacitor 46 discharges at a slower rate, which is indicated by the slight change in the slope of the line joining points 145 and 147.

In a similar manner, succeeding cycles are automatically compensated for to prevent overdriving the input circuit of tube 50. Looking at the output current wave forms indicated by 1*a* to 5*a*, inclusive, it will be noted that tube 50 is conducting a fraction of the amount of current that would normally be conducted if a conventional limiter circuit were used. Consequently, the core iron 85 of discriminator 60 will not normally be driven into saturation, and the tuning of discriminator 60 may be held within very narrow limits.

An added advantage of this invention lies in the fact that noise impulses generally have greater decay rates than the control signal. With the invention, only the very first few cycles of noise will result in output current, whereas if a limiter were used (which, it will be remembered, operates on the lower portion of the signal) a substantial amount of output current would be drawn. Therefore, the noise immunity of the signal translation system is also improved.

In a co-pending application of this inventor, Serial No. 799,901, filed March 17, 1959, now U.S. Patent 2,989,677, a signal translation system utilizing an automatic gain control circuit is described. The automatic gain control circuit of that application may be used in conjunction with the present invention to effect an even greater increase in the range of signal excursions which may be handled by the signal translation system.

What has been described is an improved means for protecting a signal translation system against wide excursions in control signal amplitude. It should be understood that numerous modifications may be made without departing from the true spirit and scope of the invention as defined in the appended claims.

What is claimed is:

1. In combination in a signal translation system for translating periodic alternating current control signals of varying amplitude, means responsive to magnitude variations in the periodic peaks of said control signals for controlling the amplitude of said translation system output comprising; an electron valve having an input circuit; a coupling network including an input terminal and first and second coupling means connected thereto; means for applying said signals to said input terminal; said first coupling means including a first capacitor and a diode serially connected across said input circuit; a resistor connected across said input circuit; a connection from the junction of said first capacitor and said diode to a point on said resistor, said first capacitor, said diode and said resistor coacting to provide a time constant less than the period of said signal for signal excursions of one polarity and a time constant greater than the period of said signal for signal excursions of the opposite polarity; said second coupling means including a second capacitor connected between said input terminal and a different point on said resistor, said different point being selected such that the discharge path of said second capacitor includes substantially all of said resistor, whereby the discharge rate of said second capacitor is dependent upon the state of charge of said first capacitor.

2. In combination; a vacuum tube having an anode, a cathode and a control grid, means for supplying operating potentials to said tube, signal translation means for translating a periodic alternating control signal of varying peak amplitude, coupling means connected between said signal translation means and said tube for coupling said control peak thereto, said coupling means including; a resistor connected from said control grid to said cathode, a first coupling capacitor connected between said signal translation means and said control grid, a second coupling capacitor connected between said signal translation means and a point on said resistor, and a diode connected from said point on said resistor to said cathode, said second coupling capacitor, said diode and a portion of said resistor coacting to provide a time constant less than the period of said signal for signal excursions of one polarity and a time constant greater than the period of said signal for signal excursions of the opposite polarity, the discharge path of said first coupling capacitor including said resistor, and the discharge rate of said first capacitor being dependent upon the state of charge of said second capacitor whereby said vacuum tube is prevented from drawing maximum anode-cathode current for appreciable time intervals despite extreme control signal peak level variations.

3. A control system responsive to remotely transmitted ultrasonic control signals of different predetermined frequencies comprising; means for receiving and translating said signals; means including a vacuum tube having tuned inductance loads each responsive to the frequency of an individual one of said control signals, said inductance loads being subject to variations in their respective tuned frequencies upon being overloaded; means for preventing maximum current flow in said tube and said inductance loads for appreciable time intervals despite excessive control signal levels comprising; coupling means connected between said means for receiving and translating and said vacuum tube; said coupling means having first and second circuit paths, said first circuit path including a first capacitor, and a resistor, said resistor being connected across the input circuit of said tube; said second circuit path including a second capacitor, a diode and a portion of said resistor with said diode connected in parallel with said portion of said resistor; said second circuit path parameters being selected to provide said second capacitor with a time constant greater than the period of said control signals for signal excursions of one polarity and a time constant less than the period of said control signals for signal excursions of the opposite polarity whereby the discharge time of said first capacitor is dependent upon the state of charge of said second capacitor and the bias on said tube is the algebraic sum of the potentials developed across said resistor, said tube conducting pulses of plate current, at the frequency of said control signal, having magnitudes determined by the magnitudes of the positive half cycles of control signal and the respective instantaneous bias voltage.

References Cited in the file of this patent

UNITED STATES PATENTS

| | | |
|---|---|---|
| 1,876,162 | Andrewes | Sept. 6, 1932 |
| 2,200,037 | Mountjoy | May 7, 1940 |
| 2,897,360 | Baugh | July 28, 1959 |
| 2,932,736 | Birkenes | Apr. 12, 1960 |